United States Patent [19]
Aylward et al.

[11] Patent Number: 5,998,119
[45] Date of Patent: Dec. 7, 1999

[54] IMAGING ELEMENT WITH A SUBSTRATE CONTAINING LOW MOLECULAR WEIGHT HINDERED AMINE STABILIZER

[75] Inventors: Peter T. Aylward, Hilton; Valerie J. Harris, Rochester, both of N.Y.

[73] Assignee: Eastman Kodak Company, Rochester, N.Y.

[21] Appl. No.: 09/141,457

[22] Filed: Aug. 27, 1998

[51] Int. Cl.⁶ ............................. G03C 1/79; B32B 23/08
[52] U.S. Cl. ..................... 430/536; 430/538; 430/201; 347/106; 428/513; 524/99
[58] Field of Search ................................. 430/536, 538, 430/201; 347/106; 428/513; 524/99

[56] References Cited

U.S. PATENT DOCUMENTS

| | | | |
|---|---|---|---|
| 3,411,908 | 11/1968 | Crawford et al. | 430/538 |
| 3,582,337 | 6/1971 | Griggs et al. | 430/538 |
| 4,352,861 | 10/1982 | von Meer et al. | 430/538 |
| 4,481,289 | 11/1984 | Homma | 430/532 |
| 4,582,785 | 4/1986 | Woodward et al. | 430/538 |
| 5,104,722 | 4/1992 | Kojima et al. | 430/538 |
| 5,147,678 | 9/1992 | Foerch et al. | 427/40 |
| 5,326,624 | 7/1994 | Tsubaki et al. | 430/538 |
| 5,503,968 | 4/1996 | Lee | 430/538 |
| 5,824,462 | 10/1998 | Ashida et al. | 430/538 |

*Primary Examiner*—Richard L. Schilling
*Attorney, Agent, or Firm*—Paul A. Leipold

[57] ABSTRACT

The invention relates to an imaging element comprising a paper substrate and a layer adjacent said paper comprising polyolefin polymer and a hindered amine stabilizer wherein said hindered amine stabilizer has a number average molecular weight of less than 2300.

16 Claims, No Drawings

IMAGING ELEMENT WITH A SUBSTRATE CONTAINING LOW MOLECULAR WEIGHT HINDERED AMINE STABILIZER

FIELD OF THE INVENTION

The present invention relates to imaging papers and, more particularly to imaging papers where the polymeric resin layer can be laminated onto the paper base at high speed and low temperature.

BACKGROUND OF THE INVENTION

A considerable amount of the worldwide imaging paper base is resin coated. The maximum speed at which a polymeric coating can be applied to an imaging paper base is often limited by the bond strength between the paper and the polymer. As speed increases and or temperature decreases, the strength of the bond between the polymer and the paper tends to decrease. This is a key consideration in the manufacture of photographic paper supports, since chemicals used in the aqueous photographic processing will tend to penetrate into the support between the polymer and the paper if the bond is poor. This will leave unsightly marks around the edges of the paper after processing.

It is, therefore, necessary to compromise between a high-speed production process and a high quality photographic product. One way to overcome this conflict is to increase the temperature of the polymer. This method is appropriate as long as the temperature is not so high that decomposition of the polymer results in deleterious physical properties or photoactive substances, which will fog the emulsion. Griggs (U.S. Pat. No. 3,582,337) claims polymer extrusion temperatures from 304° C. to 343° C. to be used at speeds of between 61 and 305 m/min. The temperatures that Griggs teaches are adequate to assure reasonable bond, but thermal degradation in the polyolefin results in occasional product imperfections (as mentioned in U.S. Pat. No. 5,503,968), which are not tolerable by today's discerning customers. These imperfections have since been reduced by the addition of antioxidants such as 4,4'-butylidene-bis(6-tert-butyl-meta-cresol). These antioxidants are adequate for reducing spot imperfections, however they also degrade bond considerably. Thus, it is no longer possible to run at the speeds claimed by Griggs and still achieve good bond at these temperatures.

Another way to overcome poor bond is to use corona discharge treatment as described in U.S. Pat. No. 3,411,908. This technique is applied to the paper base before laminating. The corona discharge technique tends to "activate" the surface resulting in better bond once the polymer is applied. Another technique that has been used is the application of flame as described in U.S. Pat. No. 5,147,678. This approach utilizes the flame caused by the burning of natural gas, which impinges on the paper support. Again, this technique activates the paper, giving it better bond after the polymer is applied. One possible disadvantage of this technique is the possibility that flame treatment dries out the paper. Since moisture is necessary to facilitate the curing of the hardener in the photographic emulsion, this reduced moisture may diminish productivity in the sensitizing operation.

Honma (U.S. Pat. No. 4,481,289) describes the use of ozone, which can be applied to the molten polymer. This method activates the polymer instead of the paper support again increasing the bond after the polymer is laminated onto the paper. In this application, Honma claims a maximum polymer extrusion temperature of 300° C. A maximum speed of 183 m/min is demonstrated which Lee (U.S. Pat. No. 5,503,968) points out is rather slow in today's environment. Lee describes a synergistic effect when flame is used in conjunction with ozone and demonstrates that speeds of greater than 400 m/min are possible. Unfortunately, as described above, this may have the disadvantage of drying the paper.

When imaging supports are subject to variations in ambient conditions over long periods of time the image-containing and resin layers tend to deteriorate into a mass of cracks which are aesthetically undesirable and which, in extreme cases, extend over the entire print completely destroying the image. All polymers are inherently prone to chemical degradation that leads to loss of mechanical properties. They undergo thermal degradation during processing such as extrusion of thin films, and photo-oxidative degradation with long-term exposure to light. $TiO_2$ catalyzes and accelerates both thermal and photo-oxidative degradation. In the art of resin coating imaging papers, the melt polymers are extruded at high temperatures and are also subjected to high shear forces. These conditions may degrade the polymer, resulting in discoloration and charring, formation of polymer slugs or "gels", and formation of lines and streaks in the extruded film from degraded material deposits on die surfaces. Also, thermally degraded polymer is less robust than non-degraded polymer for long-term stability, and may thereby shorten the life of the print.

Hindered phenol antioxidants are commonly used alone or in combination with secondary antioxidants to stabilize polymers during melt processing, but provide little protection from long term photo-oxidation. The phenolic type anti-oxidants also decrease the ability of the resin to adhere to the paper during the high speed extrusion process. They are also responsible for some forms of oxidative atmospheric gas yellowing in prints stored in the dark. This undesirable color may develop on the print or around the print edge with archival keeping, and has been attributed to colored oxidation products of phenolic antioxidants that are formed in the dark in the presence of white pigments such as $TiO_2$.

In U.S. Pat. No. 4,582,785 it is suggested using a polymeric hindered amines with greater than 2500 molecular weight as the sole stabilizer, when added to polyethylene coated photographic paper, can improve their photostability. In this patent a polymeric hindered amine is claimed as the sole stabilizer for both thermal processing and light stability in a single layer of a polymeric material, polyethylene. The adhesion of the polymeric hindered amine-containing resin to the paper is poor.

Furthermore it is desirable to make imaging elements that use other polymers than polyethylene or in combination with polyethylene. The use of such materials as polyester and or polypropylene may add improved stability and durability to the element as well as improved gloss and sheen.

There remains a need to provide an imaging support that contains pigments that are extrusion processable at low temperatures and high speeds without drying the paper, creating gels, or creating photoactive products which will fog the photographic emulsion. In addition, it must have exceptional long-term resistance to degradation and embrittlement when exposed to light and other environmental stresses, while providing an imaging support that has exceptional dark stability and prevents discoloration during dark keeping. These properties are most desirable and have significant commercial value.

PROBLEM TO BE SOLVED BY THE INVENTION

There is a need for stabilizers that result in improved adhesion of polyolefin layers to paper base at low temperature and high-speed. There is also a need for stabilizers that are more effective in prevention of aging defects such as crazing and yellowing.

SUMMARY OF THE INVENTION

It is an object of the invention to overcome disadvantages of prior imaging elements.

It is another object to provide imaging elements that have improved properties after aging.

It is a further object to provide polyolefin materials that may successfully be extruded at lower temperatures and high speeds onto paper.

These and other objects of the invention are accomplished by using an imaging element comprising a paper substrate and a layer adjacent to said paper comprising polyolefin polymer and a hindered amine stabilizer wherein said hindered amine stabilizer has a number average molecular weight of less than 2300.

ADVANTAGEOUS EFFECT OF THE INVENTION

The use of polyolefin polymer and a hindered amine stabilizer wherein said hindered amine stabilizer has a number average molecular weight of less than 2300 results in improved adhesion of polyolefin layers to paper base at low temperature and high-speed. The combination of polyolefin polymer and a hindered amine stabilizer are also more effective in prevention of aging defects such as crazing and yellowing.

DETAILED DESCRIPTION OF THE INVENTION

The invention has numerous advantages over prior practices in the art. The invention provides elements that may have polyolefin polymer layers extruded onto paper at temperatures as low as 560° F. (293° C.) with excellent adhesion to the paper. The elements of the invention have reduced crazing which is the pattern of cracks that will become apparent in a polymer if during aging its molecular weight decreases such that it becomes brittle and cracks. The low molecular weight hindered amine stabilizer of the invention minimizes the aging of the polymer; therefore, the imaging elements formed utilizing the low molecular weight hindered amine stabilizer have less yellowing upon aging and less crazing. There is a particular desire to prevent the formation of yellow edges on photographic prints upon aging. The invention is particularly effective in preventing aging from oxidation at the edges of the prints, which results in the yellow edge phenomena. The invention polyolefin polymer layer with hindered amine stabilizer may be coated at a higher speed when at lower temperatures than layers containing other less effective stabilizers. The invention provides imaging elements that have improved adhesion of polyolefin layers to paper after low temperature extrusion. The invention further provides imaging elements that have better aging properties with resistance to crazing and yellowing. The invention provides an improved base for photosensitive layers and other image receiving layers. It particularly provides an improved base for color photographic materials that require long-term stability to light and dark keeping conditions. The advantage of this invention is that by using a hindered amine with less than 2300 in number average molecular weight, results in improved adhesion to paper. This provides an advantage in that it allows the extrusion of these materials at lower melt temperatures while maintaining high line speed. Lower melt temperature results in lower energy cost as well as improved quality with a reduction of die lines and poly gels. Poly gels are typically an area in the polymer that has been degraded and may be cross-linked. The poly gels are often referred to as gel slugs. Poly gels results in a raised surface, which is objectionable to the viewing customer. With the use of hindered amines the rate of photo-oxidative degradation as well as dark keeping discoloration of the imaging support can be significantly reduced. Another advantage is that by reducing the thermal degradation during melt processing of the polymers, the imaging support does not embrittle and the life of the print is prolonged compared to non or singularly stabilized imaging supports. The use of hindered amines with a molecular weight substantially less than 2500 for imaging applications has not been reported, especially in the presence of $TiO_2$ or other pigments.

The present invention consists of a single layer of polymer, which is extruded to the top of a photographic quality substrate support by melt extrusion. As used herein the phrase "imaging element" is a material that may be used with the laminated support for the transfer of images to the support by techniques such as ink jet printing or thermal dye transfer as well as a support for silver halide images. The terms as used herein, "top", "upper", "emulsion side", "imaging side" and "face" mean the side or towards the side of an imaging member bearing the imaging layers. The terms "bottom", "lower side", and "back" mean the side or towards the side of the imaging member opposite from the side bearing the imaging layers or developed image. The term substrate as used herein refers to a support or base material that is the primary part of an imaging element such as paper, polyester, vinyl, synthetic paper, fabric, or other suitable material for the viewing of images. As used herein, the phrase "photographic element" is a material that utilizes photosensitive silver halide in the formation of images. In the case of thermal dye transfer or ink jet, the image layer that is coated on the imaging element may be any material that is known in the art such as gelatin, pigmented latex, polyurethane, polyester, poly(vinyl chloride), poly-(styrene-co-acrylonitrile), polycaprolactone, polyvinyl alcohol, polycarbonate, polyvinyl pyrrolidone, starch, and methacrylate, polymers and co-polymers of acrylic acid, polyethylene oxide, cellulosis such as hydroxymethyl cellulose and porous receivers containing silica, sol-gels, alumina, calcium carbonate, clays, talc, zinc oxide, zeolites, barium sulfate, zinc sulfide, $TiO_2$ or mixtures thereof. Mordants such as cationic polyester sulfonates may also be incorporated. The dye image-receiving layer may be present in any amount, which is effective for the intended purpose. An overcoat layer may be further coated over the dye-receiving layer such as described in U.S. Pat. No. 4,775,657, the disclosure of which is incorporated by reference. The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film-forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

The reflective support of the present invention includes a resin layer with a stabilizing amount of hindered amine extruded on the top side of the imaging layer substrate. Hindered amine light stabilizers (HALS) originate from 2,2,6,6-tertramethylpiperidine. The hindered amine should be added to the polymer layer at about 0.01–5% by weight of said resin layer in order to provide resistance to polymer degradation upon exposure to UV light. The preferred amount is at about 0.05–3% by weight. This provides excellent polymer stability and resistance to cracking and yellowing while keeping the expense of the hindered amine to a minimum. Examples of suitable hindered amines with molecular weights of less than 2300 are Bis(2,2,6,6-tetramethyl-4-piperidinyl)sebacate; Bis(1,2,2,6,6-pentamethyl-4- piperidinyl)sebacate; Bis(1,2,2,6,6-pentamethyl-4-piperidinyl)2-n-butyl-(3,5-di-tert-butyl-hydroxy-benzyl)malonate; 8-Acetly-3-dodecyl-7,7,9,9-tetramethly-1.3,8-triazaspirol(4,5)decane-2,4-dione; Tetra (2,2,6,6-tetramethyl-4-piperidinyl)1,2,3,4-butanetetracarboxylate; 1-(-2-[3,5-di-tert-butyl-4-hydroxyphenyl-propionyloxyl]ethyl)-4-(3,5-di-tert-butyl-4-hydroxyphenylpropionyloxy)-2,2,6,6-tetramethylpiperidine; 1,1'-(1,2-ethenadiyl)bis(3,3,5,5-tetramethyl-2-piperazinone); The preferred hindered amine is 1,3,5-triazine-2,4,6-triamine,N,N'''-[1,2-ethanediylbis[[[4,6-bis(butyl(1,2,2,6,6-pentamethyl-4-piperidinyl) amino]-1,3,5-triazine-2-yl]imino]-3,1 propanediyl]]-bis [N', N''-dibutyl-N',N''-bis(1,2,2,6,6-pentamethyl-4-piperidinyl) which will be referred to as Compound A. Compound A is preferred because when mixtures of polymers and Compound A are extruded onto imaging paper the polymer to paper adhesion is excellent and the long term stability of the imaging system against cracking and yellowing is improved.

Suitable polymers for the resin layer include polyethylene, polypropylene, polymethylpentene, polystyrene, polybutylene, and mixtures thereof. Polyolefin copolymers, including copolymers of polyethylene, propylene and ethylene such as hexene, butene, and octene are also useful. Polyethylene is preferred, as it is low in cost and has desirable coating properties. As polyethylene, usable are high-density polyethylene, low-density polyethylene, linear low density polyethylene, and polyethylene blends. Other suitable polymers include polyesters produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Other polymers are matrix polyesters having repeat units from terephthalic acid or naphthalene dicarboxylic acid and at least one glycol selected from ethylene glycol, 1,4-butanediol and 1,4-cyclohexanedimethanol such as poly(ethylene terephthalate), which may be modified by small amounts of other monomers. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607; 4,459,402; and 4,468,510. Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

Any suitable white pigment may be incorporated in the polyolefin layer, such as, for example, zinc oxide, zinc sulfide, zirconium dioxide, white lead, lead sulfate, lead chloride, lead aluminate, lead phthalate, antimony trioxide, white bismuth, tin oxide, white manganese, white tungsten, and combinations thereof. The preferred pigment is titanium dioxide because of its high refractive index, which gives excellent optical properties at a reasonable cost. The pigment is used in any form that is conveniently dispersed within the polyolefin. The preferred pigment is anatase titanium dioxide. The most preferred pigment is rutile titanium dioxide because it has the highest refractive index at the lowest cost. The average pigment diameter of the rutile $TiO_2$ is most preferably in the range of 0.1 to 0.26 $\mu$m. The pigments that are greater than 0.26 $\mu$m are too yellow for an imaging element application and the pigments that are less than 0.1 $\mu$m are not sufficiently opaque when dispersed in polymers. Preferably, the white pigment should be employed in the range of from about 10 to about 50 percent by weight, based on the total weight of the polyolefin coating. Below 10 percent $TiO_2$, the imaging system will not be sufficiently opaque and will have inferior optical properties. Above 50 percent $TiO_2$, the polymer blend is not manufacturable. The surface of the $TiO_2$ can be treated with an inorganic compounds such as aluminum hydroxide, alumina with a fluoride compound or fluoride ions, silica with a fluoride compound or fluoride ion, silicon hydroxide, silicon dioxide, boron oxide, boria-modified silica (as described in U.S. Pat. No. 4,781,761), phosphates, zinc oxide, $ZrO_2$, etc. and with organic treatments such as polyhydric alcohol, polyhydric amine, metal soap, alkyl titanate, polysiloxanes, silanes, etc. The organic and inorganic $TiO_2$ treatments can be used alone or in any combination. The amount of the surface treating agents is preferably in the range of 0.2 to 2.0% for the inorganic treatment and 0.1 to 1% for the organic treatment, relative to the weight of the weight of the titanium dioxide. At these levels of treatment the $TiO_2$ disperses well in the polymer and does not interfere with the manufacture of the imaging support.

The polymer, hindered amine light stabilizer, and the $TiO_2$ are mixed with each other in the presence of a dispersing agent. Examples of dispersing agents are metal salts of higher fatty acids such as sodium palmitate, sodium stearate, calcium palmitate, sodium laurate, calcium stearate, aluminum stearate, magnesium stearate, zirconium octylate, zinc stearate, etc, higher fatty acids, higher fatty amide, and higher fatty acids. The preferred dispersing agent is sodium stearate and the most preferred dispersing agent is zinc stearate. Both of these dispersing agents give superior whiteness to the resin-coated layer.

For photographic use, a white base with a slight bluish tint is preferred. The layers of the waterproof resin coating preferably contain colorants such as a bluing agent and magenta or red pigment. Applicable bluing agents include commonly know ultramarine blue, cobalt blue, oxide cobalt phosphate, quinacridone pigments, and a mixture thereof. Applicable red or magenta colorants are quinacridones and ultramarines.

The resin may also include a fluorescing agent, which absorb energy in the UV region and emit light largely in the blue region. Any of the optical brighteners referred to in U.S. Pat. No. 3,260,715 or a combination thereof would be beneficial.

The resin may also contain an antioxidant(s) such as hindered phenol primary antioxidants used alone or in combination with secondary antioxidants. Examples of hindered phenol primary antioxidants include pentaerythrityl tetrakis [3-(3,5-di-tert-butyl-4-hydroxyphenyl)proprionate] (such as Irganox 1010), octadecyl 3-(3,5-di-tert-butyl-4-hydroxyphenyl)proprionate (such as Irganox 1076 which will be referred to as compound B), benzenepropanoic acid 3,5-bis(1,1-dimethyl)-4-hydroxy-2[3-[3,5-bis(1,1-dimethylethyl)-4-hydroxyphenyl)-1-oxopropyl)hydrazide (such as Irganox MD1024), 2,2'-thiodiethylenebis[3-(3,5-di-tert-butyl-4-hydroxyphenyl)proprionate] (such as Irganox 1035), 1,3,5-trimethyl-2,4,6-tri(3,5-di-tert-butyl-4-hydroxybenzyl)benzene (such as Irganox 1330), but are not limited to these examples. Secondary antioxidants include organic alkyl and aryl phosphites including examples such as triphenylphosphite (such as Irgastab TPP), tri(n-propylphenyl-phophite) (such as Irgastab SN-55), 2,4-bis(1,1-dimethylphenyl) phosphite (such as Irgafos 168).

The hindered amine light stabilizer, $TiO_2$, colorants, slip agents, optical brightener, and antioxidant are incorporated either together or separately with the polymer using a continues or Banburry mixer. A concentrate of the additives in the form of a pellet is typically made. The concentration of the rutile pigment can be from 20% to 80% by weight of the masterbatch. The master batch is then adequately diluted for use with the resin.

The support to which the waterproof resin layer is laminated may be a polymeric, a synthetic paper, cloth, woven polymer fibers, or a cellulose fiber paper support, or laminates thereof. The base also may be a microvoided polyethylene terephalate such as disclosed in U.S. Pat. Nos. 4,912,333; 4,994,312; and 5,055,371. The preferred support is a photographic grade cellulose fiber paper.

For photographic applications, chemical sensitization of the emulsion typically employs sensitizers such as: sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating, and extrusion coating.

The silver halide emulsions utilized in this invention may be comprised of any halide distribution. Thus, they may be comprised of silver chloride, silver chloroiodide, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in *The Theory of the Photographic Process,* Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11), and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The invention may be utilized with the materials disclosed in *Research Disclosure,* September 1997, Item 40145. The invention is particularly suitable for use with the material color paper examples of sections XVI and XVII. The couplers of section II are also particularly suitable. The Magenta I couplers of section II, particularly M-7, M-10, M-11, and M-18, set forth below are particularly desirable.

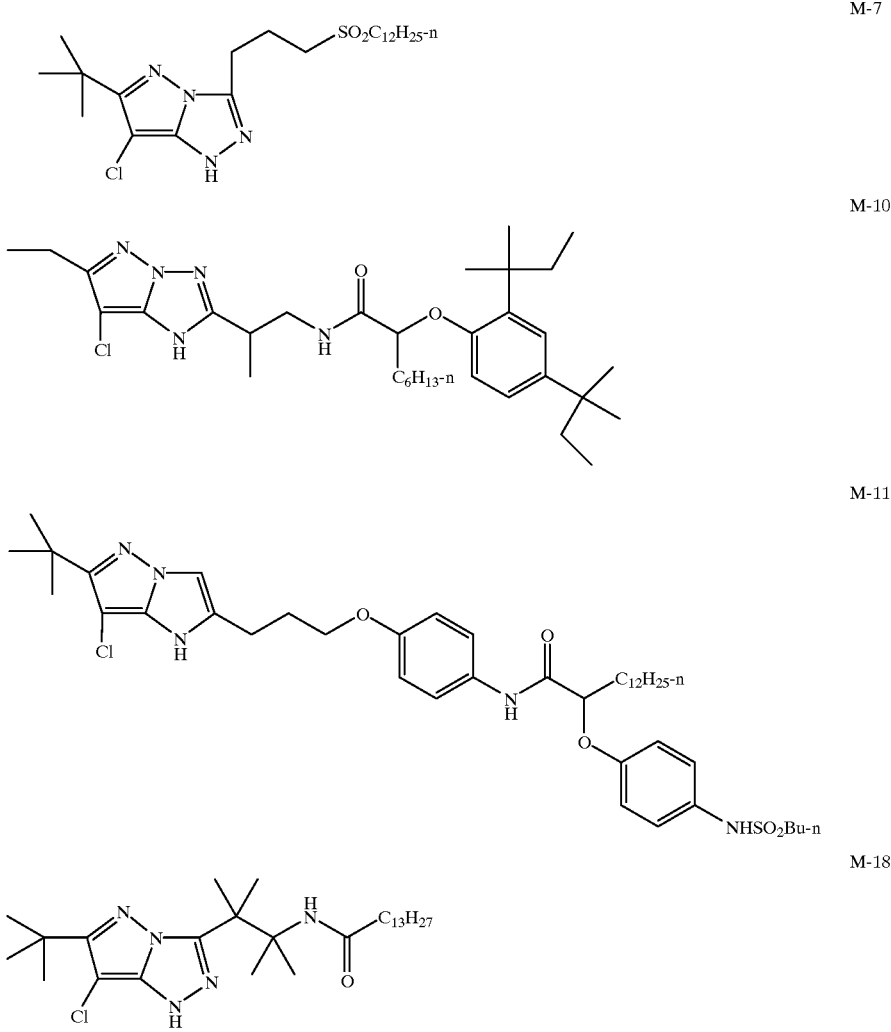

M-7

M-10

M-11

M-18

The photographic elements of this invention may use emulsions doped with Group VIII metals such as iridium, rhodium, osmium, and iron as described in *Research Disclosure,* September 1996, Item 38957, Section I, published by Kenneth Mason Publications, Ltd., Dudley Annex, 12a North Street, Emsworth, Hampshire PO10 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 $\mu$m.

In the following Table, reference will be made to (1) *Research Disclosure,* December 1978, Item 17643, (2) *Research Disclosure,* December 1989, Item 308119, and (3) *Research Disclosure,* September 1996, Item 38957, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
|---|---|---|
| 1 | I, II | Grain composition, |
| 2 | I, II, IX, X, XI, XII, XIV, XV | morphology and preparation. Emulsion preparation. |
| 3 | I, II, III, IX A & B | including hardeners, coating aids, addenda, etc. |
| 1 | III, IV | Chemical sensitization and |
| 2 | III, IV | spectral sensitization/ |
| 3 | IV, V | desensitization |
| 1 | V | UV dyes, optical brighteners, |
| 2 | V | luminescent dyes |
| 3 | VI | |
| 1 | VI | Antifoggants and stabilizers |
| 2 | VI | |
| 3 | VII | |
| 1 | VIII | Absorbing and scattering |
| 2 | VIII, XIII, XVI | materials; Antistatic layers; |
| 3 | VIII, IX C & D | matting agents |
| 1 | VII | Image-couplers and image- |
| 2 | VII | modifying couplers; Dye |
| 3 | X | stabilizers and hue modifiers |
| 1 | XVII | Supports |
| 2 | XVII | |
| 3 | XV | |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | Chemical processing; |
| 2 | XIX, XX, XXII | Developing agents |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum as well as with electron beam, beta radiation, gamma radiation, X ray, alpha particle, neutron radiation, and other forms of corpuscular and wave-like radiant energy in either noncoherent (random phase) forms or coherent (in phase) forms, as produced by lasers. When the photographic elements are intended to be exposed by X rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4™ (Eastman Kodak Company) Process or other processing systems suitable for developing high chloride emulsions.

To form the water-proof resin coating according to the present invention, the pellet containing the pigment and other additives is subjected to hot-melt coating onto a running support of paper or synthetic paper. If desired, the pellet is diluted with a polymer prior to hot melt coating. For a single layer coating the resin layer may be formed by lamination. The die is not limited to any specific type and may be any one of the common dies such as a T-slot or coat hanger die. An exit orifice temperature in heat melt extrusion of the water-proof resin ranges from 500–660° F. Further, before coating the support with resin, the support may be treated with an activating treatment such as corona discharge, flame, ozone, plasma, or glow discharge.

The thickness of the resin layer which is applied to a base paper of the reflective support used in the present invention at a side for imaging, is preferably in the range of 5 to 100 $\mu$m and most preferably in the range of 10 to 50 $\mu$m.

The thickness of the resin layer applied to a base paper on the side opposite the imaging element is preferably in a range from 5 to 100 $\mu$m and more preferably from 10 to 50 $\mu$m.

The surface of the waterproof resin coating at the imaging side may be a glossy, fine, silk, grain, or matte surface. On the surface of the water-proof coating on the backside which is not coated with an imaging element may also be glossy, fine, silk, or matte surface. The preferred water-proof surface for the backside away from the imaging element is matte.

The following examples illustrate the practice of this invention. They are not intended to be exhaustive of all possible variations of the invention. Parts and percentages are by weight unless otherwise indicated. Molecular weights are number average unless otherwise indicated.

EXAMPLES

A photographic paper support was produced by refining a pulp furnish of 100% bleached hardwood Kraft through a double disk refiner, then a Jordan conical refiner. To the resulting pulp furnish was added 0.8% sodium stearate, 0.5% aluminum chloride, 0.15% stilbene triazine FWA, 0.2% polyamide-epichlorohydrin, 0.7% anionic polyacrylamide, and 0.6% $TiO_2$ on a dry weight basis. An about 31.5 lbs. per 1000 sq. ft. (ksf) bone dry weight base paper was made on a fourdrinier paper machine, wet pressed to a solid of 42%, and dried to a moisture of 3% using steam-heated dryers achieving an apparent density of 0.70 g/cc. The paper base was then surface sized using a vertical size press with a 16% hydroxyethylated cornstarch solution to achieve a loading of 4.2 wt. % starch. The surface sized support was dried to a moisture of 8.8% using steam-heated dryers and calendered to an apparent density of 1.08 gm/cc.

Example 1

Using a continuous mixer 36% of a 0.22$\mu$ rutile TiO2, 1% Zinc stearate, 0.15% optical brightener, 0.3% Compound A with a molecular weight of 2286, 0.6% blue colorant, and 0.002% red colorant were blended to make a concentrated pellet.

Example 2

Using a continuous mixer 43.5% of an anatase $TiO_2$, 1% Zinc stearate, 0.15% optical brightener, 0.3% Compound A with a molecular weight of 2286, 0.6% blue colorant, and 0.002% red colorant were blended to make a concentrated pellet.

Example 3 Control

Using a continuous mixer 43.5% of an anatase $TiO_2$, 1% Zinc stearate, 0.15% optical brightener, 0.3% Compound B, 0.6% blue colorant, and 0.002% red colorant were blended to make a concentrated pellet.

Example 4 Control

Using a continuous mixer 43.5% of an anatase $TiO_2$, 1 % Zinc stearate, 0.15% optical brightener, 0.3% of the hindered amine poly[[6-[(1,1,3,3-tetramethylbutyl)amino]-s-triazine-2,4-diyl][(2,2,6,6-tetramethyl-4-piperidyl)imino]hexamethylene[(2,2,6,6-tetramethyl-4-piperidyl)imino]] with a molecular weight of greater than 2500, 0.6% blue colorant, and 0.002% red colorant were blended to make a concentrated pellet.

33% of each of the resins from Example 1–4 were blended with 67% low-density polyethylene and 25 $\mu$m of the resin blend was extrusion coated unto the photographic paper. The resins were extruded at 800 ft/min using an Eagan 2.5" extruder. The temperature of the extruded polymer was varied from at 560° F. to 600° F.

ANSI test T539 cm-88, *The Determination Of Polyethylene Adhesion To A Porous Substrate,* was used to give a subjective comparison of the adhesion of the example resins. In this method, if tearing would not separate the coating, a small "X" was cut in the coating on one ply of the lamination. A strip of cellophane tape is firmly adhered to the specimen over the "X". While holding the specimen against a flat, horizontal surface, the tape was stripped from the specimen. All tests were conducted in the cross direction of the samples. If the coating separates, an attempt was made to delaminate the specimen by pulling the plies apart. The adhesion was rated as "poor" if there was no resistance to delamination, good if the coating had considerable resistance to delamination, and excellent is the coating separated with 100% fiber tear of the porous substrate.

Yellow edge was measure by incubating the resin-coated samples in ambient dark conditions. The amount of yellowing was tested by measuring the b* of the samples before and after the dark incubation. The CIE color system uses b* as the mathematical representation of the amount of yellow and blue that is in a sample. The larger the number the more yellow the sample.

Delta $b^* = b^*$ after incubation $-b^*$ prior to incubation.

The larger the delta b, the more yellowing that has occurred.

Long-term light stability was measured by incubating the samples with 100 foot candles of light for 50 days at 50% humidity and 50° C. The resin will begin cracking when the molecular weight decreases to from around 300,000 to 10,000.

Adhesion, yellow edge, and long-term stability of each of the examples was tested and tabulated in Tables 1–3 below.

TABLE 1

Resin to paper adhesion

| Resin | Extrusion Temperature | | | | |
|---|---|---|---|---|---|
| | 600° F. | 590° F. | 580° F. | 570° F. | 560° F. |
| Example 1 | Excellent | Excellent | Excellent | Excellent | Excellent |
| Example 2 | Excellent | Excellent | Excellent | Excellent | Excellent |
| Example 3 control | Excellent | Poor | Poor | Poor | Poor |
| Example 4 control | Excellent | Excellent | Excellent | Poor | Poor |

TABLE 2

Yellow edge

| Resin | Delta b* at 600° F. |
|---|---|
| Example 1 | 0.1 |
| Example 2 | 0.6 |
| Example 3 control | 3.9 |
| Example 4 control | 0.5 |

TABLE 3

Long term stability

| Resin | Days to crack |
|---|---|
| Example 1 | >4000 |
| Example 2 | >4000 |
| Example 3 control | 100 |
| Example 4 control | >4000 |

Table 1 clearly demonstrates that the invention (Example 1 and 2) is superior to the prior art of Example 3 and 4 for resin to paper adhesion. The prior art failed to adhere to the paper between 570° F. and 590° F. while the invention still had excellent adhesion at 560° F.

The long-term color stability of the invention is demonstrated in the yellow edge test of Table 2. The yellow edge of the invention, Example 1 and 2, yellowed at least six times less than the control in Example 3.

The long-term cracking resistance of the invention is superior to the control in Example 3. Under the incubation conditions, the invention will last for at least 4000 days before any sign of cracking will occur.

The resin to paper adhesion, yellow edge, and long-term stability of the low molecular weight invention method is superior to the prior art comparisons.

The invention has been described in detail with particular reference to certain preferred embodiments thereof, but it will be understood that variations and modifications can be effected within the spirit and scope of the invention.

What is claimed is:

1. An imaging element comprising a paper substrate and a layer adjacent said paper comprising polyolefin polymer and a hindered amine stabilizer wherein said hindered amine stabilizer has a number average molecular weight of less than 2300.

2. The imaging element of claim 1 wherein said layer further comprises a white pigment.

3. The imaging element of claim 1 wherein said layer is between 5 and 100 μm thick.

4. The imaging element of claim 1 wherein said hindered amine stabilizer comprises between 0.01 and 5% by weight of the layer.

5. The imaging element of claim 1 wherein said layer comprises greater than 10% by weight titanium dioxide.

6. The imaging element of claim 1 wherein said layer comprises between 10% and 50% by weight titanium dioxide.

7. The imaging element of claim 1 wherein said hindered amine stabilizer has a number average molecular weight of between 200 and 2300.

8. The imaging element of claim 2 wherein said white pigment comprises rutile titanium dioxide having a particle size of from 0.1 to 0.26 μm.

9. The imaging element of claim 1 wherein said layer further comprises optical brighteners.

10. The imaging element of claim 1 wherein said layer further comprises tinting agents.

11. The imaging element of claim 1 wherein said layer further comprises other stabilizing agents.

12. The imaging element of claim 2 wherein said element further comprises at least one layer of photosensitive silver halide and a dye forming coupler.

13. The imaging element of claim 1 wherein said layer is on the top of said paper.

14. The imaging element of claim 13 further comprising a bottom layer adjacent said paper comprising polyolefin polymer wherein said hindered amine stabilizer has a number average molecular weight of less than 2300.

15. The imaging element of claim 1 further comprising a phenol antioxidant.

16. The imaging element of claim 15 further comprising a phosphite antioxidant.

* * * * *